United States Patent
Ayoub et al.

(10) Patent No.: US 12,301,460 B1
(45) Date of Patent: May 13, 2025

(54) MULTI-PORT LOAD BALANCING USING TRANSPORT PROTOCOL

(71) Applicant: Amazon Technologies, Inc., Seattle, WA (US)

(72) Inventors: Hani Ayoub, Majd Al Kurum (IL); Leah Shalev, Zikhron Ya'Agov (IL); Talor Kovary, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 17/937,019

(22) Filed: Sep. 30, 2022

(51) Int. Cl.
*H04L 47/125* (2022.01)
*H04L 43/10* (2022.01)
*H04L 45/74* (2022.01)

(52) U.S. Cl.
CPC ............ *H04L 47/125* (2013.01); *H04L 43/10* (2013.01); *H04L 45/74* (2013.01)

(58) Field of Classification Search
CPC ........ H04L 47/125; H04L 43/10; H04L 45/74
USPC .......................................................... 709/238
See application file for complete search history.

(56) References Cited

U.S. PATENT DOCUMENTS

| | | |
|---|---|---|
| 5,699,500 A | 12/1997 | Dasgupta |
| 6,788,686 B1 | 9/2004 | Khotimsky et al. |
| 6,990,528 B1 | 1/2006 | Neal et al. |
| 7,088,718 B1 | 8/2006 | Srivastava |
| 7,171,484 B1 | 1/2007 | Krause et al. |
| 7,293,107 B1 | 11/2007 | Hanson et al. |
| 7,912,064 B2 | 3/2011 | Elzur |
| 7,913,077 B2 | 3/2011 | Ko et al. |
| 8,031,729 B2 | 10/2011 | Elzur |
| 8,190,960 B1 | 5/2012 | Bahadur et al. |
| 9,654,385 B2 | 5/2017 | Chu et al. |
| 9,667,723 B2 | 5/2017 | Pandya |
| 9,747,249 B2 | 8/2017 | Cherian et al. |

(Continued)

FOREIGN PATENT DOCUMENTS

| | | |
|---|---|---|
| CN | 1625179 A | 6/2005 |
| CN | 101848203 A | 9/2010 |

(Continued)

OTHER PUBLICATIONS

Bryant, S. et al., "Pseudowire Emulation Edge-to-Edge (PWE3) Control Word for Use over an MPLS PSN", XP015044817, Feb. 1, 2006, 12 pages.

(Continued)

*Primary Examiner* — Adil Ocak
(74) *Attorney, Agent, or Firm* — Weaver Austin Villeneuve & Sampson LLP

(57) ABSTRACT

A different network address is assigned to each port of a first device and a second device that are configured to exchange traffic over a multi-path connection of a transport layer protocol. When a timeout is detected by the first device indicating that a packet sent to a first network address assigned to a first port of the second device was not received, the first device can regenerate the packet with a second network address assigned to a second port of the second device, and send the regenerated packet to the second network address of the second device. The first device can send heartbeat packets to the first port in an exponential backoff manner and, upon receiving a heartbeat acknowledgement from the first port, resume sending the packets to the first port.

20 Claims, 8 Drawing Sheets

(56) References Cited

U.S. PATENT DOCUMENTS

| | | | |
|---|---|---|---|
| 9,985,903 B2 | 5/2018 | Shalev et al. | |
| 9,985,904 B2 | 5/2018 | Shalev et al. | |
| 10,148,570 B2 | 12/2018 | Shalev et al. | |
| 10,305,955 B1* | 5/2019 | Li | H04L 65/762 |
| 10,375,167 B2 | 8/2019 | Shamis et al. | |
| 10,430,373 B2 | 10/2019 | Cherian et al. | |
| 10,498,654 B2 | 12/2019 | Shalev et al. | |
| 10,645,019 B2 | 5/2020 | Shalev et al. | |
| 10,673,772 B2 | 6/2020 | Shalev et al. | |
| 10,917,344 B2 | 2/2021 | Shalev et al. | |
| 11,451,476 B2 | 9/2022 | Shalev et al. | |
| 2002/0198927 A1 | 12/2002 | Craddock et al. | |
| 2003/0031183 A1 | 2/2003 | Kashyap et al. | |
| 2003/0035433 A1 | 2/2003 | Craddock et al. | |
| 2003/0053457 A1 | 3/2003 | Fox et al. | |
| 2004/0003126 A1 | 1/2004 | Boucher et al. | |
| 2004/0042458 A1 | 3/2004 | Elzu | |
| 2004/0042483 A1 | 3/2004 | Elzur et al. | |
| 2004/0044796 A1 | 3/2004 | Vangal et al. | |
| 2004/0049612 A1 | 3/2004 | Boyd et al. | |
| 2004/0049774 A1 | 3/2004 | Boyd et al. | |
| 2004/0190516 A1 | 9/2004 | Williams | |
| 2005/0060442 A1 | 3/2005 | Beverly et al. | |
| 2005/0144310 A1 | 6/2005 | Biran et al. | |
| 2005/0180327 A1 | 8/2005 | Banerjee et al. | |
| 2006/0007935 A1 | 1/2006 | Bennett et al. | |
| 2006/0075067 A1 | 4/2006 | Blackmore et al. | |
| 2006/0101090 A1 | 5/2006 | Aloni et al. | |
| 2006/0101225 A1 | 5/2006 | Aloni et al. | |
| 2006/0168274 A1 | 7/2006 | Aloni et al. | |
| 2007/0208820 A1 | 9/2007 | Makhervaks et al. | |
| 2008/0043750 A1 | 2/2008 | Keels et al. | |
| 2009/0106771 A1 | 4/2009 | Benner et al. | |
| 2009/0219939 A1 | 9/2009 | Isosaari | |
| 2009/0222564 A1 | 9/2009 | Freimuth et al. | |
| 2011/0280247 A1 | 11/2011 | Roskind | |
| 2012/0023304 A1 | 1/2012 | Chan et al. | |
| 2012/0089694 A1 | 4/2012 | Pandya | |
| 2012/0155458 A1 | 6/2012 | Larson et al. | |
| 2012/0155468 A1 | 6/2012 | Greenberg et al. | |
| 2012/0265837 A1 | 10/2012 | Grant et al. | |
| 2012/0281714 A1 | 11/2012 | Chang et al. | |
| 2012/0287944 A1 | 11/2012 | Pandit et al. | |
| 2012/0300778 A1* | 11/2012 | Tamura | H04L 12/66 370/392 |
| 2013/0051222 A1 | 2/2013 | Gavrilov et al. | |
| 2013/0080561 A1 | 3/2013 | Fox et al. | |
| 2013/0114606 A1 | 5/2013 | Schrum, Jr. et al. | |
| 2013/0145035 A1 | 6/2013 | Pope et al. | |
| 2013/0268980 A1 | 10/2013 | Russell | |
| 2013/0304796 A1 | 11/2013 | Jackowski et al. | |
| 2014/0052808 A1 | 2/2014 | Krishnan et al. | |
| 2014/0153572 A1 | 6/2014 | Hampel et al. | |
| 2014/0310369 A1 | 10/2014 | Makhervaks et al. | |
| 2014/0358972 A1 | 12/2014 | Guarrieri et al. | |
| 2015/0010090 A1 | 1/2015 | Sugimoto | |
| 2015/0052280 A1 | 2/2015 | Lawson | |
| 2015/0124652 A1 | 5/2015 | Dharmapurikar et al. | |
| 2015/0127797 A1 | 5/2015 | Attar et al. | |
| 2015/0163144 A1 | 6/2015 | Koponen et al. | |
| 2015/0172226 A1 | 6/2015 | Borshteen et al. | |
| 2015/0179227 A1 | 6/2015 | Russell | |
| 2015/0263932 A1 | 9/2015 | Chunduri et al. | |
| 2015/0373165 A1 | 12/2015 | Anand et al. | |
| 2016/0026604 A1 | 1/2016 | Pandit et al. | |
| 2016/0094356 A1 | 3/2016 | Xiang et al. | |
| 2016/0212214 A1 | 7/2016 | Rahman et al. | |
| 2016/0226755 A1 | 8/2016 | Hammam et al. | |
| 2016/0234127 A1 | 8/2016 | Agarwal et al. | |
| 2016/0344633 A1 | 11/2016 | Jiao et al. | |
| 2017/0006142 A1 | 1/2017 | Kwon | |
| 2017/0134535 A1 | 5/2017 | Osamura et al. | |
| 2017/0187496 A1 | 6/2017 | Shalev et al. | |
| 2017/0187621 A1 | 6/2017 | Shalev et al. | |
| 2017/0187629 A1 | 6/2017 | Shalev et al. | |
| 2017/0187846 A1 | 6/2017 | Shalev et al. | |
| 2017/0195240 A1 | 7/2017 | Chen et al. | |
| 2017/0223154 A1 | 8/2017 | Hammam et al. | |
| 2017/0346742 A1 | 11/2017 | Shahar et al. | |
| 2018/0004705 A1 | 1/2018 | Menachem et al. | |
| 2018/0219980 A1 | 8/2018 | McCulley et al. | |
| 2020/0259759 A1 | 8/2020 | Shalev et al. | |
| 2021/0119930 A1 | 4/2021 | Debbage et al. | |
| 2022/0247696 A1* | 8/2022 | He | H04L 1/1841 |
| 2024/0022638 A1* | 1/2024 | Wang | H04L 67/145 |

FOREIGN PATENT DOCUMENTS

| | | | |
|---|---|---|---|
| CN | 103929492 A | 7/2014 | |
| CN | 103986647 A | 8/2014 | |
| CN | 104541257 A | 4/2015 | |
| CN | 104620664 A | 5/2015 | |
| JP | 2002305535 A | 10/2002 | |
| JP | 2004531175 A | 10/2004 | |
| JP | 2005524264 A | 8/2005 | |
| JP | 2008507201 A | 3/2008 | |
| JP | 2015050746 A | 3/2015 | |
| WO | WO-2013169073 A1 | 11/2013 | |

OTHER PUBLICATIONS

"Open Fabric Interfaces", OpenFabrics Interfaces Working Group (OFIWG), Libfabric Programmer's Manual: Libfabric Open Fabrics [online], 2015, 6 pages, URL: http://ofiwg.github.io/libfabric [retrieved from the Internet on Dec. 29, 2015].

"Open Fabrics Software", OFED Overview. Open Fabrics Alliance, Sep. 7, 2015, 2 pages URL: https://www.openfabrics.org/index.php/openfabrics-software.html [retrieved from the Internet on Dec. 29, 2015].

Russell, R.D., "Introduction to RDMA Programming", University of New Hampshire InterOperability Laboratory, 2012, 76 pages. URL: http://www.cs.unh.edu/~rdr/rdma-intro-module.ppt.

U.S. Appl. No. 16/712,589, inventors Shalev et al., filed on Dec. 12, 2019.

U.S. Appl. No. 17/809,872, inventors Ilany et al., filed on Jun. 29, 2022.

\* cited by examiner

MULTI-PORT LOAD BALANCING USING TRANSPORT PROTOCOL

BACKGROUND

Networks can be implemented as packet-switched networks that include devices such as servers that manage workloads and respond to client requests, switches that connect devices together, routers that perform packet forwarding functions, etc. The devices may communicate over an Ethernet local area network (LAN) using transport protocols such as Transmission Control Protocol (TCP), User Datagram Protocol (UDP), or Scalable Reliable Datagram (SRD).

BRIEF DESCRIPTION OF THE DRAWINGS

Various embodiments in accordance with the present disclosure will be described with reference to the drawings, in which.

DETAILED DESCRIPTION

Figure 1:
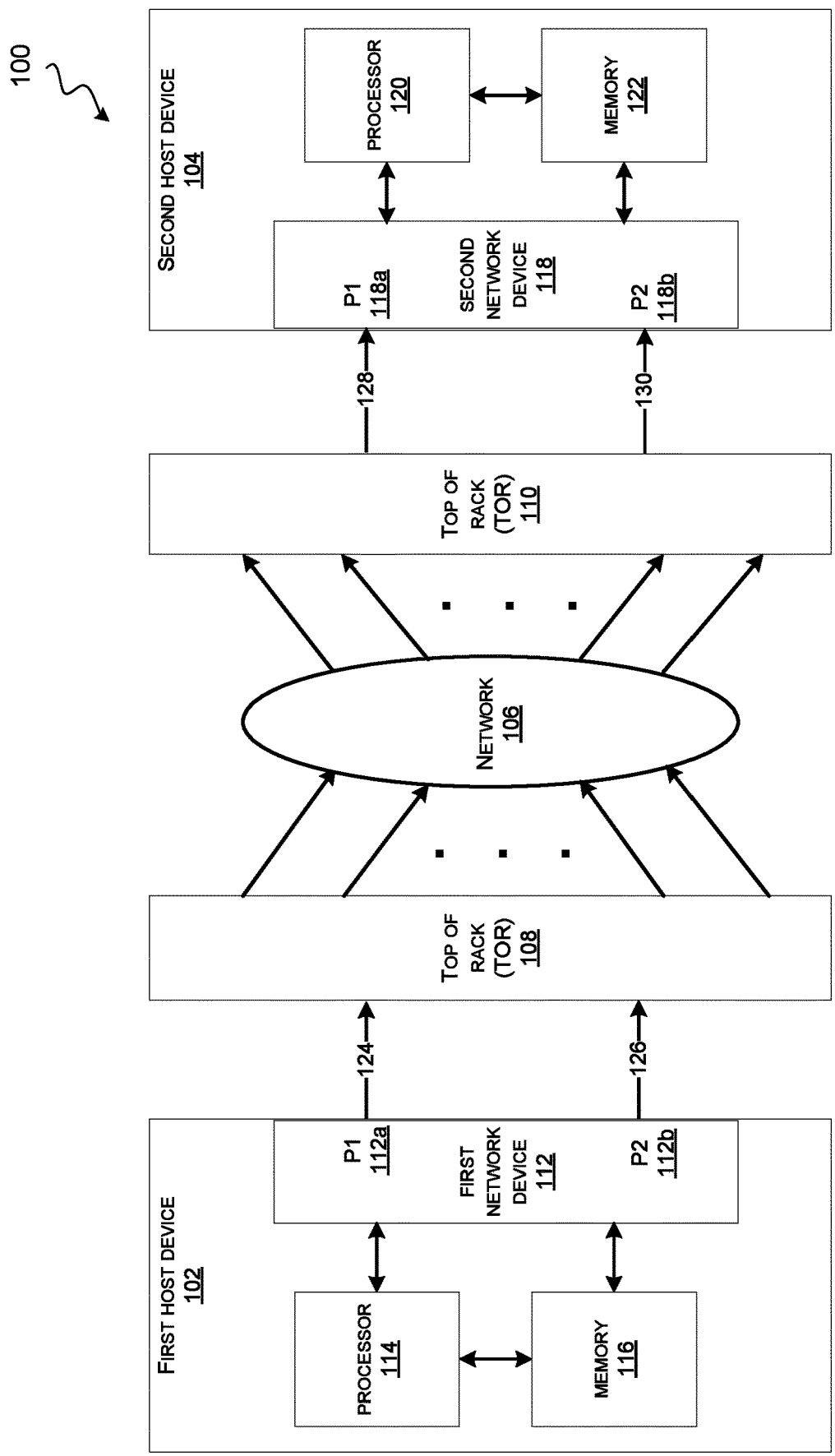
FIG. 1 illustrates a system comprising a first host device and a second host device configured to exchange data over a network, according to some embodiments.

In some systems, multiple host devices may be configured to execute virtual instances associated with client applications. The host devices may include server computers comprising processors, memory, network interface cards, and other suitable components. For example, a first host device may be configured to exchange traffic with a second host device via multiple components in a network comprising switches, fabrics, routers, etc., based on a transport layer protocol, e.g., TCP, UDP, or SRD. In some implementations, the first host device may include a first network device that is coupled to the network via a first top-of-the-rack (TOR) switch. The second host device may include a second network device that is coupled to the network via a second TOR switch. In some examples, a plurality of host devices may exchange traffic via a plurality of TOR switches coupled to the network.

In some examples, the first network device may operate as a source device and transmit packets on a set of TX ports comprising a first TX port and a second TX port, and the second network device may operate as a destination device and receive the packets from the network on a set of RX ports comprising a first RX port and a second RX port. In some systems, a first floating IP address may be assigned to all the ports in the set of TX ports, and a second floating IP address may be assigned to all the ports in the set of RX ports. The first network device may transmit the packets on the first TX port and the second TX port based on multi-port load balancing (MPLB). As an example, a first half of the packets may be transmitted on the first TX port and a second half of the packets may be transmitted on the second TX port via the first TOR switch. The first half and the second half of the packets may be received by the second TOR switch over the network.

In some systems, the second TOR switch may determine which RX port of the second network device should receive a given packet that has arrived over the network. In some implementations, the second TOR switch may perform a 5-tuple hash of some of the contents of the packet header of each packet and determine which RX port should receive this packet based on the outcome of the hash function. For example, the second TOR switch may perform a 5-tuple hash of the protocol number, source and destination IP addresses, and source and destination transport protocol port numbers retrieved from the packet headers. In this example, the source IP address may include the first floating IP address and the destination IP address may include the second floating IP address for each packet transmitted by the first network device. The source and destination transport protocol port numbers may include the TCP source port number and the TCP destination port number for the TCP transport protocol. As an example, the second TOR switch may determine that the half of the packets will be received by the first RX port and the other half of the packets will be received by the second RX port based on the outcome of the 5-tuple hash.

In some instances, some of the packets may be dropped on the path to the second network device due to a network event (e.g., faulty hardware, power failures, overloaded servers, configuration errors, or environmental factors such as excessive temperature, voltage, humidity, etc.). The network event may result in a down port or link (e.g., Ethernet link) that connects the second RX port to the second TOR switch. In this case, the second TOR switch may still receive the second half of the packets and perform the 5-tuple hash; however, these packets will be dropped due to the network event. The first network device may not become aware immediately of the down link/port since the first set of packets with the same destination IP address (e.g., second floating IP address) continue to be received by the second network device.

When the SRD transport protocol is used for exchanging the traffic between the host devices, the first network device may retransmit the second set of packets again when an acknowledgement is not received in a certain retransmission timeout period for each transmitted packet. The retransmission timeout period for the SRD transport protocol can be significantly less (e.g., hundreds of microseconds) as compared to the retransmission timeout period for the TCP protocol (e.g., several seconds). However, the first network device may still not become aware of the down link/port right away, and the first network device may retransmit the second set of packets again, which may be dropped again. The link failure may be eventually detected by the network and the second TOR switch may stop forwarding traffic to the second RX port; however, the tail latency may take some time before the second TOR switch will start rerouting all the traffic to the first RX port.

The techniques described herein can be used to reduce the tail latency during network events that cause a link failure. In some embodiments, each port on the source and destination network devices can be assigned a different network address, and the source network device can select the network address of the port of the destination network device that should receive a given packet, instead of relying on the TOR switch connected to the destination network device to select the port. The network address can be an Internet Protocol (IP) address, a Media Access Control (MAC) address, or any suitable identifier that can be used to identify a physical port or differentiate among physical ports of a network device. For example, the first TX port can be assigned a first IP address, the second TX port can be assigned a second IP address, the first RX port can be assigned a third IP address, and the fourth RX port can be assigned a fourth IP address. Thus, the second TOR switch may route each packet received via the network based on the destination IP address in the IP header of the packet. When the link between the second TOR switch and the second RX port, or any port on either side of the link goes down, all the packets sent to the fourth IP address may be dropped. In this case, the first network device may identify that the packets sent to the fourth IP addresses are being dropped, and regenerate those packets with the destination IP address as the third IP address. The second TOR switch can route these regenerated packets successfully to the first RX port based on the destination IP address being the third IP address.

Some embodiments can rely on the SRD protocol for transmitting the packets over the network, which can enable the use of multiple paths to send packets of the same user flow in parallel over the network. Using multiple paths in parallel can enable the spreading of packets of a given flow onto different paths to reduce overall latency and improve reliability. Since, the SRD protocol can provide a much shorter retransmission timeout period as compared to the TCP protocol, the link failure can be detected quickly based on the destination IP address, and the regenerated packets with a different destination IP address can be routed to an operational RX port. Thus, the tail latency can be reduced significantly by assigning a specific IP address to each port and allowing the SRD protocol to select an alternative RX port as soon as a packet drop is detected.

In some embodiments, the source network device may also transmit heartbeat packets to the failed RX port with an increasing interval between the sequential heartbeat packets until a constant threshold interval has been reached. Once the constant threshold interval is reached between the sequential heartbeat packets, the source network device can continue transmitting the heartbeat packets until an acknowledgement is received in response to the heartbeat packet. Once an acknowledgement to the heartbeat packet is received indicating that the second RX port is operational again, the source network device can resume transmitting the packets to the second RX port.

Thus, some embodiments can be used to reduce the latency from detecting a down path to rerouting the packets on another path by assigning a separate IP address to each port of the destination network device. As soon as the source network device detects a timeout, it can regenerate the packets with a different IP address for sending to another RX port without waiting for the second TOR switch or another protocol layer to detect the down link/port and reroute the packets to the other RX port.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a system 100 comprising a first host device 102 and a second host device 104 configured to exchange data over a network 106, in some embodiments.

Each of the first host device 102 and the second host device 104 may be a server, a computer system, or any network connected device. Each of the first host device 102 and the second host device 104 may act as a source device that generates packets to be transmitted over the network 106 and/or a destination device that receives packets generated by a source device. Any network connected device may act as a source device or a destination device at various times. In the example of FIG. 1, the first host device 102 may act as a source device and the second host device 104 may act as a destination device during certain operations.

The network 106 may include multiple switches, fabrics, routers, etc., to provide a multi-path connection between the first host device 102 and the second host device 104 based on a transport layer protocol, e.g., Scalable Reliable Datagram (SRD). The SRD transport protocol (sometimes referred to as Relaxed Reliable Datagram (RRD) protocol) may enable the use of multiple paths to send packets of the same user flow in parallel over the network 106. Using multiple paths in parallel can enable the spreading of packets of a given flow onto different paths to reduce overall latency and improve reliability. In some examples, the first host device 102 and the second host device 104 may be executing virtual instances associated with various client applications that are configured to exchange traffic over the network 106. In some examples, the transport layer protocol may provide the multi-path connection based on the Equal Cost Multi-Path (ECMP) algorithm to exchange the traffic between the first host device 102 and the second host device 104.

The first host device 102 may include a processor 114 coupled to a first network device 112 and memory 116. The second host device 104 may include a processor 120 coupled to a second network device 118 and memory 122. The first network device 112 may include a plurality of ports that may be coupled to the network 106 via a top-of-the-rack (TOR) switch 108. For example, the plurality of ports may include a first port (P1) 112a and a second port (P2) 112b that may be coupled to the TOR switch 108 via links 124 and 126, respectively. In some examples, the links 124 and 126 may provide Ethernet connectivity between the first host device 102 and the TOR switch 108. The second network device 118 may include a plurality of ports that may be coupled to the network 106 via a TOR switch 110. For example, the plurality of ports may include a first port (P1) 118a and a second port (P2) 118b that may be coupled to the TOR switch 110 via links 128 and 130, respectively. In some examples, the links 128 and 130 may provide Ethernet connectivity between the second host device 104 and the TOR switch 110. In various implementations, the network 106 may include multiple TOR switches. The TOR switch 110 may be the last or final TOR switch along the multipath network to the second network device 118.

In some examples, the TOR switch 108 may be connected to a plurality of host devices or network devices via respective links, and the TOR switch 110 may be connected to a plurality of host devices or network devices via respective links; however, only the first host device 102 and the second host device 104 are shown in FIG. 1 for ease of discussion. Furthermore, FIG. 1 shows only two ports P1 and P2 for each network device; however, other implementations may include higher number of ports for each of the first network device 112 and the second network device 118.

In some examples, an application executing on the processor 114 may have data to be sent to another application executing on the processor 120. The data can be formatted into packets comprising a packet payload and a packet header. The packet header may include a transport layer protocol header encapsulated with a network layer protocol header for transmitting over the network 106 to the second network device 118. In some implementations, the transport protocol can be the SRD transport protocol, and the SRD packet header may include a sequence number, and an acknowledgement number, according to the SRD transport protocol. The SRD transport protocol may lack physical port information. The sequence number can be used for identifying and/or re-ordering the packets at the receiver. The acknowledgment number may be used to acknowledge receipt of a packet corresponding to the sequence number. The SRD transport protocol can enable the use of multiple ports for the same connection, which can be beneficial for applications involving high traffic (e.g., high performance computing, storage services, etc.).

The network protocol header may include a source network address and a destination network address. For example, the network protocol can be the Internet Protocol (IP), and the IP protocol header may include the source IP address and the destination IP address. Note that some embodiments are described using the IP address as the network address, but it may be understood that the techniques described herein can be used with any type of network address or information that can identify a physical port, or can be used to differentiate among physical ports of a network device. In some implementations, each network address may include information that can be used to identify a specific port based on the given transport protocol. According to some embodiments, a different network address may be assigned to each of the ports of the first network device 112 and the second network device 118 so that the first network device 112 is aware of the ports of the second network device 118 where the packets transmitted by the ports of the first network device 112 will be received. For example, a first IP address may be assigned to the P1 112*a*, a second IP address may be assigned to the P2 112*b*, a third IP address may be assigned to the P1 118*a*, and a fourth IP address may be assigned to the P2 118*b*.

The first network device 112 and the second network device 118 may first establish the SRD protocol for exchanging the traffic before selecting the ports. According to some embodiments, the first network device 112 can select the ports of the second network device 118 where the packets transmitted by first network device 112 will be received based on any multi-port load balancing (MPLB) algorithm. The packet header for each packet transmitted on the port 112*a* may include the first IP address as the source IP address and the packet header for each packet transmitted on the port 112*b* may include the second IP address as the source IP address.

As an example, the first network device 112 may select the first set of packets to be received by the P1 118*a* and the second set of packets to be received by the P2 118*b*. In this case, the packet header for each packet in the first set of packets may include the third IP address as the destination IP address and the packet header for each packet in the second set of packets may include the fourth IP address as the destination IP address. The packets may be transmitted by the ports 112*a*, 112*b* via the TOR switch 108 and will be received by the TOR switch 110. The TOR switch 110 may determine that the first set of packets are destined to the P1 118*a* based on the destination IP address being the third IP address, and that the second set of packets are destined to the P2 118*b* based on the destination IP address being the fourth IP address. Thus, the TOR switch 110 may route the first set of packets to the P1 118*a* and the second set of packets to the P2 118*b*.

When the link 130 goes down, the first network device 112 may detect a retransmission timeout indicating a packet sent to the fourth IP address of the second network device 118 has not been received. For example, the first network device 112 may not receive an SRD packet from the second network device 118 with the acknowledgement number corresponding to the sequence number of the lost packet within a retransmission timeout period after transmitting that packet to the P2 118*b*. In this case, the first network device 112 may regenerate the packet with the third IP address and send the regenerated packet to the second network device 118. The regenerated packet may be received by the TOR switch 110 which will forward the regenerated packet to the P1 118*a* based on the third IP address in its header. The first network device 112 may mark the fourth IP address associated with the down link/port as suspicious in order to avoid sending user packets to that port.

In some embodiments, the first network device 112 may also send heartbeat packets to the P2 118*b* at an increasing interval between sequential heartbeat packets. For example, the SRD packet header may include a heartbeat indicator bit that can be enabled (e.g., set to 1) identifying the packet as a heartbeat packet. Once the increasing interval has reached a certain threshold interval, the first network device 112 may continue sending the heartbeat packets at a constant threshold interval between the sequential heartbeat packets until a heartbeat acknowledgment has been received in response to a heartbeat packet. As an example, the first network device 112 may send heartbeat packets at the increasing interval of 100 microsecs, 200 microsecs, 400 microsecs, 800 microsec, etc., and then at a constant threshold interval of 1 second until the heartbeat acknowledgment is received. Once the heartbeat acknowledgment is received indicating that the link 130 is operational again, the first network device 112 may select the P2 118*b* for receiving the second set of packets and resume transmitting the second set of packets to the fourth IP address.

Figure 2:
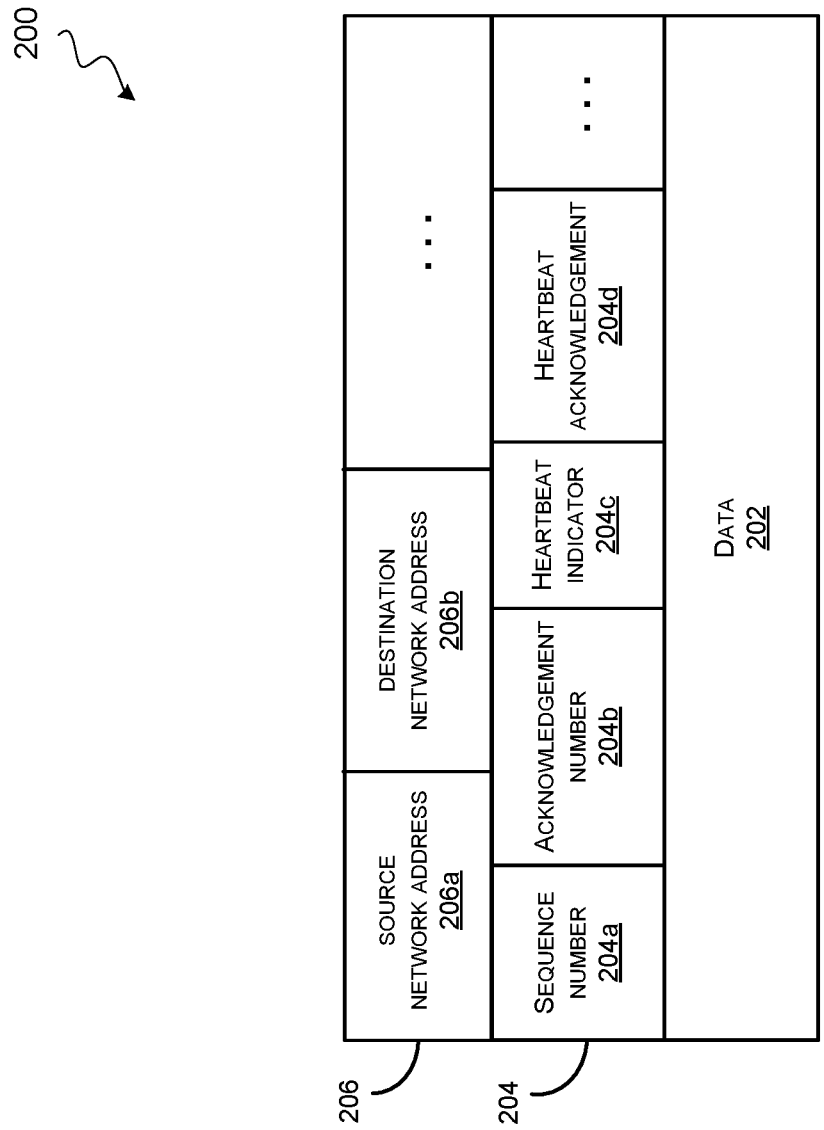
FIG. 2 illustrates an example packet comprising the packet headers and a packet payload, according to some embodiments.

FIG. 2 illustrates an example packet 200 comprising the packet headers and a packet payload, according to some embodiments.

The example packet 200 may include payload data 202 that has been encapsulated with an SRD protocol header 204, which has been further encapsulated in a network protocol header 206. The SRD protocol header 204 may include information associated with the SRD transport layer protocol. As an example, the SRD protocol header 204 may include a sequence number 204*a*, an acknowledgement number 204*b*, a heartbeat indicator 204*c*, a heartbeat acknowledgement 204*d*. The SRD protocol header 204 may include additional information and/or fields which are not shown here for ease of explanation. The network protocol header 206 may include information associated with the network protocol used for the transmission over the network 106. As an example, the network protocol header 206 may include a source network address 206*a*, a destination network address 206*b*, and any other suitable information based on the implementation. The network protocol header 206 can be an IP protocol header, and may include additional information and fields used by the IP protocol.

Referring back to FIG. 1, the first network device 112 may transmit a first packet comprising the first IP address as the source network address 206a, the third IP address as the destination network address 206b, the sequence number 204a corresponding to the first packet, and the heartbeat indicator 204c as 0 or disabled. The first packet may be transmitted by the P1 112a using the SRD protocol and will be received by the TOR switch 110. The TOR switch 110 may determine that the first packet is to be received by the P2 118a based on the P2 118a being associated with the third IP address, and route the first packet to the P2 118a via the link 128. Similarly, the first network device 112 may transmit a second packet comprising the second IP address as the source network address 206a, the fourth IP address as the destination network address 206b, the sequence number 204a corresponding to the second packet, and the heartbeat indicator 204c as 0 or disabled. The second packet may be transmitted by the P1 112b using the SRD protocol and will be received by the TOR switch 110. The TOR switch 110 may determine that the second packet is to be received by the P2 118b based on the P2 118b being associated with the fourth IP address, and route the second packet to the P2 118b via the link 130.

For each packet transmitted by the first network device 112, an acknowledgment packet comprising the acknowledgement number corresponding to the sequence number of the packet is expected to be received. In some implementations, the first transmit device 112 may start a timeout counter after transmitting each packet which can be used to determine whether a corresponding acknowledgement packet has been received from the second network device 118 within an expected time period. As discussed previously with reference to FIG. 1, when the link 130 goes down or become non-operational, the first network device 112 may not receive any acknowledgment packets corresponding to the dropped packets even after the retransmission timeout period has expired.

According to some embodiments, as soon as the first network device 112 detects that the acknowledgment packets are not being received for the packets that were transmitted to the P2 118b, the first network device 112 may regenerate those packets with the destination network address 206b as the third IP address for transmitting the regenerated packets to the P1 118a. The first network device 112 can transmit the regenerated packets with the third IP address without first attempting to retransmit the dropped packets to the fourth IP address. The TOR switch 110 can route these packets to the P1 118a instead of the P2 118b based on the destination network address 206b in the IP header. This allows the network to continue operating with minimal interruption despite having a down link in the network.

Additionally, the first network device 112 may start monitoring the health of the P2 118b by sending heartbeat packets to the P2 118b in an exponential backoff manner. For example, the heartbeat packets may include the source network address 206a as the first IP address or the second IP address, the destination network address 206b as the fourth IP address for the P2 118b, and the heartbeat indicator 204c set to 1 or enabled. The first network device 112 may keep transmitting heartbeat packets destined to the P2 118b at an increasing interval between the sequential heartbeat packets. Once the interval reaches a certain threshold interval, the first network device 112 may continue sending the heartbeat packets at a constant threshold interval until a heartbeat acknowledgement is received from the P2 118b indicating that the link 130 is operational again. This is explained with reference to FIG. 3.

Figure 3:
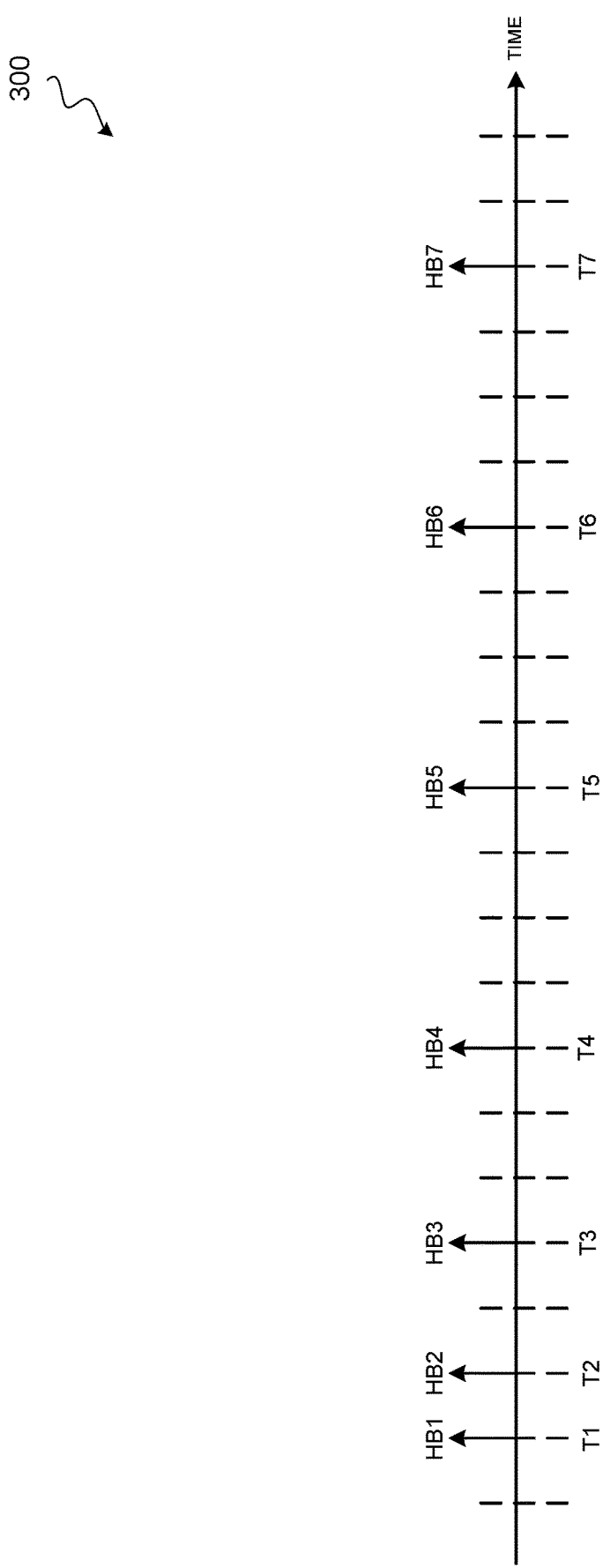
FIG. 3 illustrates an example timeline for transmitting the heartbeat packets, in accordance with some embodiments.

FIG. 3 illustrates an example timeline 300 for transmitting the heartbeat packets in accordance with some embodiments.

When a timeout is detected by the first network device 112, the first network device 112 can start sending heartbeat packets to the P2 118b in an exponential backoff manner. As an example, the first network device 112 may transmit a first heartbeat (HB1) packet at time T1, a second heartbeat (HB2) packet at time T2, a third heartbeat (HB3) packet at time T3, a fourth heartbeat (HB4) packet at time T4, and a fifth heartbeat (HB5) packet at time T5. As shown in FIG. 3, the time interval between the sequential heartbeat packets HB1, HB2, HB3, HB4, and HB5 increases as one time duration, two time durations, three time durations, and then four time durations. If a constant threshold interval is set as 4 time durations, once the increasing time interval reaches 4 time durations, the first network device 112 may continue transmitting the heartbeat packets at the constant threshold interval. As shown in FIG. 3, when the increasing time interval reaches the constant threshold interval of 4 time durations after transmitting the HB5 packet, a sixth heartbeat (HB6) packet is transmitted 4 time durations later at T6, and a seventh heartbeat (HB7) packet is transmitted 4 time durations later at T7.

The first network device 112 may continue transmitting the heartbeat packets every 4 time durations until a heartbeat acknowledgement is received from the P2 118b. Once the heartbeat acknowledgement is received from the P2 118b in response to a heartbeat packet (e.g., the heartbeat acknowledgement 204d is set), it may indicate that the link 130 is operational again. In this case, the first network device 112 may start sending packets with the fourth IP address at the destination network address 206b for transmitting to the P2 118b. The TOR switch 110 can route the regenerated packets to the P2 118b based on the fourth IP address being the destination IP address.

In some cases, a TOR switch may break down or become non-operational, and, therefore, all the packets arriving at that TOR switch may be dropped. For example, when the TOR switch 110 breaks down, the second network device 118 may not be able to receive any packets routed via the TOR switch 110. Some embodiments can provide additional redundancy with the TOR switches by assigning a TOR switch to each port at the receiver, as described with reference to FIG. 4.

Figure 4:
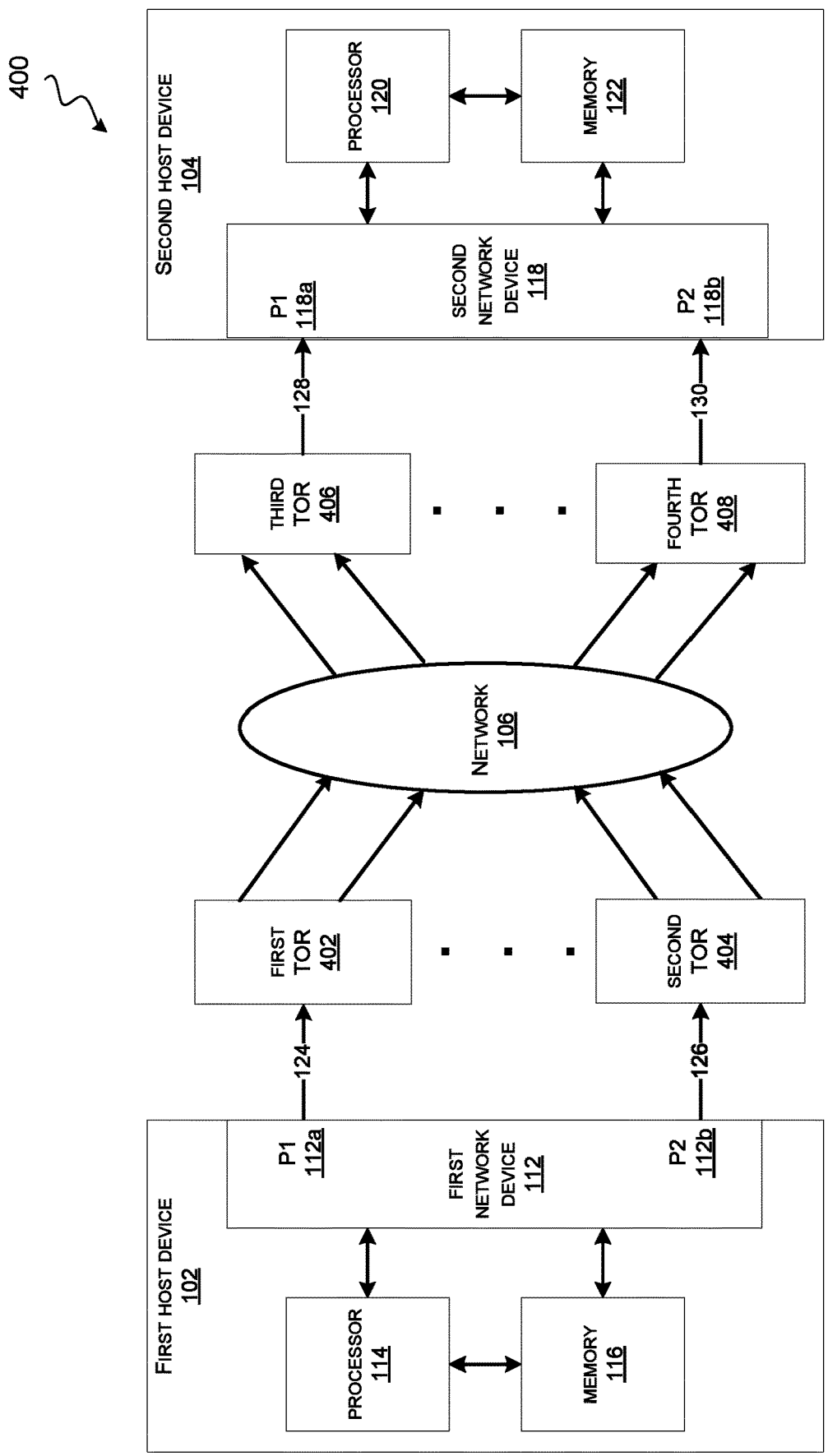
FIG. 4 illustrates an example system with a separate top-of-the-rack (TOR) switch coupled to each port of a first network device and a second network device, in accordance with some embodiments.

FIG. 4 illustrates an example system 400 with a separate TOR switch coupled to each port of the first network device 112 and the second network device 118, in accordance with some embodiments.

In some embodiments, a separate TOR switch may be coupled to each port in the plurality of ports of the first network device 112, and a separate TOR switch may be coupled to each port in the plurality of ports of the second network device 118. In various embodiments, multiple such TOR switches may be coupled to different host devices and/or network devices on either end of the network. As shown in FIG. 4, a first TOR 402 may be coupled to the P1 112a via the link 124 and a second TOR 404 may be coupled to the P2 112b via the link 126. A third TOR 406 may be coupled to the P1 118a via the link 128 and a fourth TOR 408 may be coupled to the P2 118b via the link 130. Each of the TOR switches 402, 404, 406, and 408 may include similar functionality as the TOR switches 108 and 110. In various implementations, the network 106 may include multiple TOR switches. The TOR switches 406-408 may be the last or final TOR switches along the multipath network to the second network device 118.

Referring back to the previous example, when the link 130 or the fourth TOR 408 breaks down or becomes non-operational, the second set of packets can be routed to the P1 118a via the third TOR 406. For example, in addition to regenerating the dropped packets with the destination network address 206b as the third IP address, the regenerated packets can be routed to the third TOR 406 instead of the fourth TOR 408 through the network 106.

Figure 5:
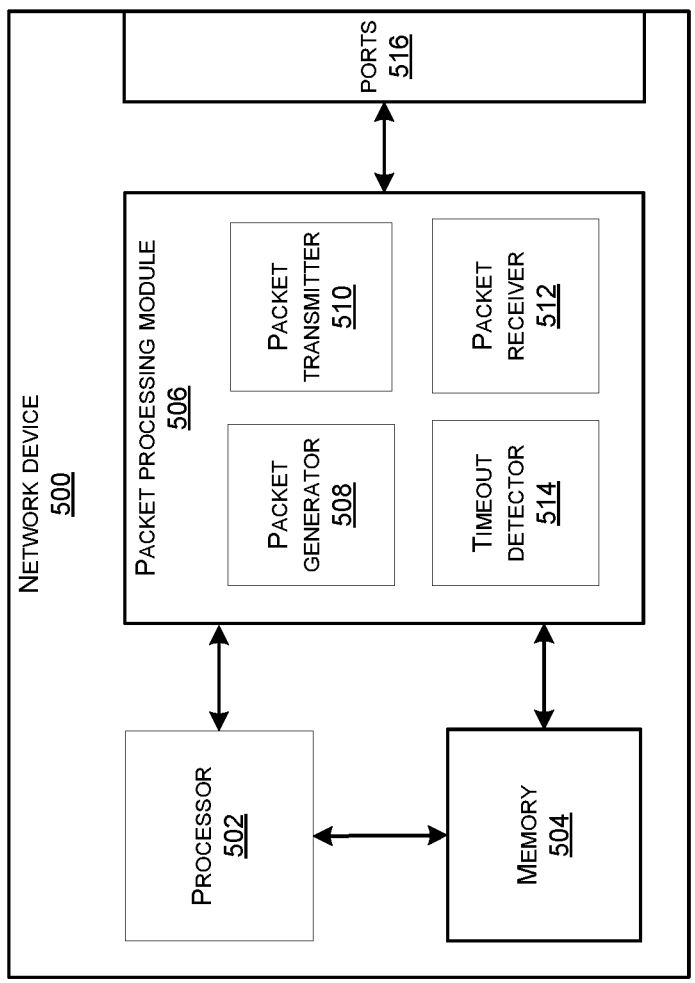
FIG. 5 illustrates example components of a network device, according to some embodiments.

FIG. 5 illustrates example components of a network device 500, according to some embodiments. The network device 500 can be an example of the first network device 112 and/or the second network device 118.

The network device 500 may include a processor 502, a memory 504, a packet processing module 506, and ports 516. The network device 500 may include other or different components that are not shown here, e.g., a direct memory access (DMA) engine, media access control (MAC) unit, physical layer interface (e.g., Ethernet), etc. The network device 500 may also include interfaces to communicate with other components of the host device, e.g., the processor, and the memory of the host device. The packet processing module 506 may include a packet generator 508, a packet transmitter 510, a packet receiver 512, and a timeout detector 514.

The ports 516 (physical ports) may include a plurality of transmission (TX) ports and receiver (RX) ports for transmitting or receiving packets. For example, the ports may include the P1 112a, P2 112b, P1 118a, and the P2 118b. In some embodiments, each port in the ports 516 may be coupled to a TOR switch via a link, e.g., an Ethernet connection. Each port may also include transceiver(s) or other suitable components to enable the transmission or reception of the packets via the respective link.

The memory 504 may include different types of memory, e.g., registers, queues, look-up-tables, buffers, RAMs, or ROMs. The memory 504 can be used to store data associated with the transfer of packets. For example, the memory 504 can be used to store various network addresses and their corresponding status (e.g., active, inactive, or suspicious). The active status may indicate that a link or a device is operational, the inactive status may indicate that a link or device is non-operational, and the suspicious status may indicate that the link or device may be temporarily down. The memory 504 can also be used to store certain parameters, e.g., the constant threshold interval for sending the heartbeat packets, and a transport protocol retransmission timeout threshold for detecting a down link/device. In various examples, the transport protocol retransmission timeout threshold may include the SRD retransmission timeout threshold.

The packet generator 508 may be configured to generate the packets for transmission over the network to another network device. In some embodiments, the packet generator 508 may generate the packets 200 by encapsulating the payload data 202 with the SRD protocol header 204 and the network protocol headed 206, as described with reference to FIG. 2. The packet generator 508 may also be configured to regenerate the packets with a different destination network address 206b upon detection of a failed link, port, or TOR device. In some examples, the packet generator 508 may generate the heartbeat packets with the heartbeat indicator 204c set to 1 or enabled. The packet generator 508 may also be configured to generate the acknowledgement packets in response to receiving the corresponding packets from the source device, and the heartbeat acknowledgement packets in response to receiving the corresponding heartbeat packets from the source device.

The packet transmitter 510 may be configured to send various packets generated or regenerated by the packet generator 508 to the TX ports in the ports 516 for transmitting to the RX ports of another network device over the network. In some implementations, the packet transmitter 510 may format the packets for transmission via the TOR switch 108 over the network 106 to the TOR switch 110, e.g., by adding additional headers for different protocol layers.

The packet receiver 512 may be configured to receive the packets from the ports 516 that were received at the RX ports from another network device via a TOR switch over the network. In some implementations, the packet receiver 512 may parse the packets for removing any additional headers that were added by the packet transmitter of the other network device for transmission over the network 106.

The timeout detector 514 may be configured to detect a retransmission timeout when a packet sent to a destination network address hasn't been received within a predefined time period. In some implementations, the timeout detector 512 may manage multiple retransmission timeout counters to determine whether a corresponding acknowledgment packet has been received from the destination device for each packet transmitted by the network device 500. For example, the timeout detector 512 may start a retransmission timeout counter after a packet is transmitted by the network device, and compare the retransmission timeout counter value with a retransmission timeout threshold to determine whether a corresponding acknowledgment packet has been received within the predefined time period. If a retransmission timeout is detected, the packet generator 508 can be notified to regenerate the dropped packets for transmitting to another destination IP address, and also generate the heartbeat packets for transmitting to the suspicious port. In some examples, the status of the down link/device in the memory 504 can be updated from active to suspicious in order to stop sending the data packets on the down path.

Figure 6:
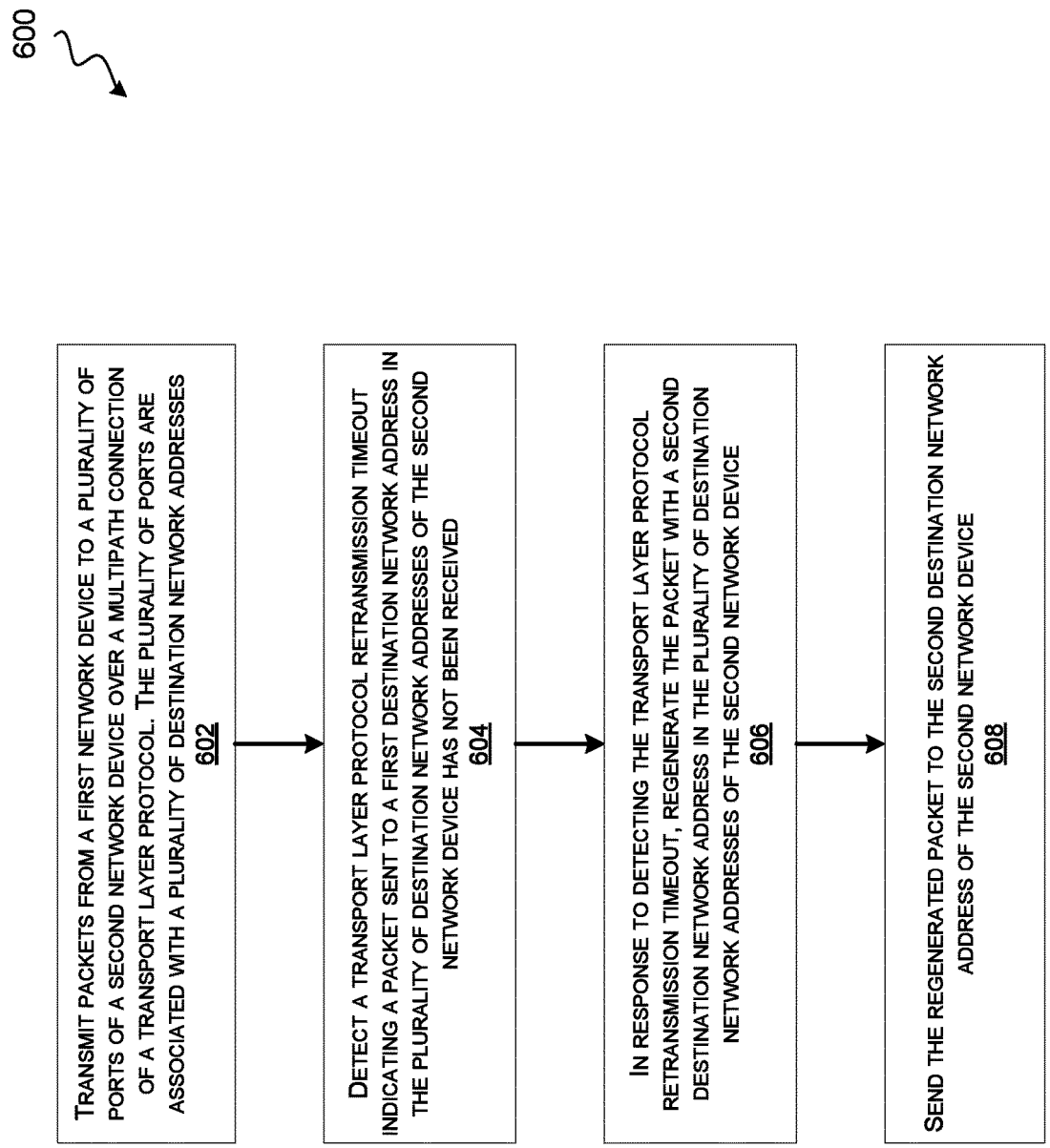
FIG. 6 illustrates an example flow chart for a method executed by a network device, according to some embodiments.

FIG. 6 illustrates an example flow chart 600 for a method executed by a network device according to some embodiments. As an example, the network device can be the first network device 112, the second network device 118, or the network device 500.

In step 602, the method includes transmitting packets from a first network device to a plurality of ports of a second network device over a multi-path connection of a transport layer protocol. The plurality of ports may be associated respectively with a plurality of destination network addresses. For example, the first network device 112 may transmit packets to the P1 118a and the P2 118b of the second network device 118 over the multi-path connection of the SRD protocol. The packets may be received by the TOR switch 110 via the network 106, which may forward the packets to the P1 118a and the P2 118b via the links 128 and 130, respectively. The first network device 112 may transmit the first set of the packets on the P1 112a and the second set of the packets on the P2 112b. As discussed previously, the P1 112a may be associated with first IP address, the P2 112b may be associated with the second IP address, the P1 118a may be associated with third IP address, and the P2 118b may be associated with the fourth IP address.

In step 604, the method further includes detecting a transport layer protocol retransmission timeout indicating a packet sent to a first destination network address in the plurality of destination network addresses of the second network device has not been received. The first network device 112 may detect an SRD retransmission timeout indicating that a packet sent to the fourth IP address of the second network device 118 has not been received. For example, the timeout detector 512 may detect the SRD retransmission timeout if an acknowledgement packet in response to one of the packets transmitted to the P2 118*b* has not been received. As discussed with reference to FIG. 1 and FIG. 4, in some examples, the SRD retransmission timeout may occur due to the breakdown of the link 130 or the fourth TOR 408.

In step 606, the method further includes regenerating the packet with a second destination network address in the plurality of destination network addresses of the second network device in response to detecting the transport layer protocol retransmission timeout. For example, the packet generator 508 in the first network device 112 may regenerate the packet with the third IP address in response to detecting the SRD retransmission timeout. As discussed with reference to FIG. 2, the regenerated packet may include the third IP address for the destination network address 206*b* in the SRD packet header 204.

In step 608, the method further includes sending the regenerated packet to the second destination network address of the second network device. The first network device 112 may send the regenerated packet to the third IP address of the second network device 118. For example, the first network device 112 may send the regenerated packet via the TOR switch 108 to the TOR switch 110 over the network 106. The TOR switch 110 may receive the regenerated packet and forward it to the P1 118*a* based on the third IP address in the packet header.

The method may further include sending heartbeat packets to the fourth IP address at an increasing interval between the sequential heartbeat packets, until the increasing interval has reached the constant threshold interval. Once a heartbeat acknowledgement is received from the P2 118*b* in response to a heartbeat packet indicating that the link 130 is operational again, the first network device 112 can stop sending the heartbeat packets and resume transmitting the data packets to the P2 118*b*.

As discussed with reference to FIGS. 1-6, the embodiments can utilize the short retransmission timeout period for the SRD protocol to detect a link/port failure quickly so that the packets destined to a down link/port can be rerouted to the operational links/ports by regenerating those packets with the new destination network address. Thus, the tail latency caused due to the network events can be reduced which can improve the system reliability and performance.

Figure 7:
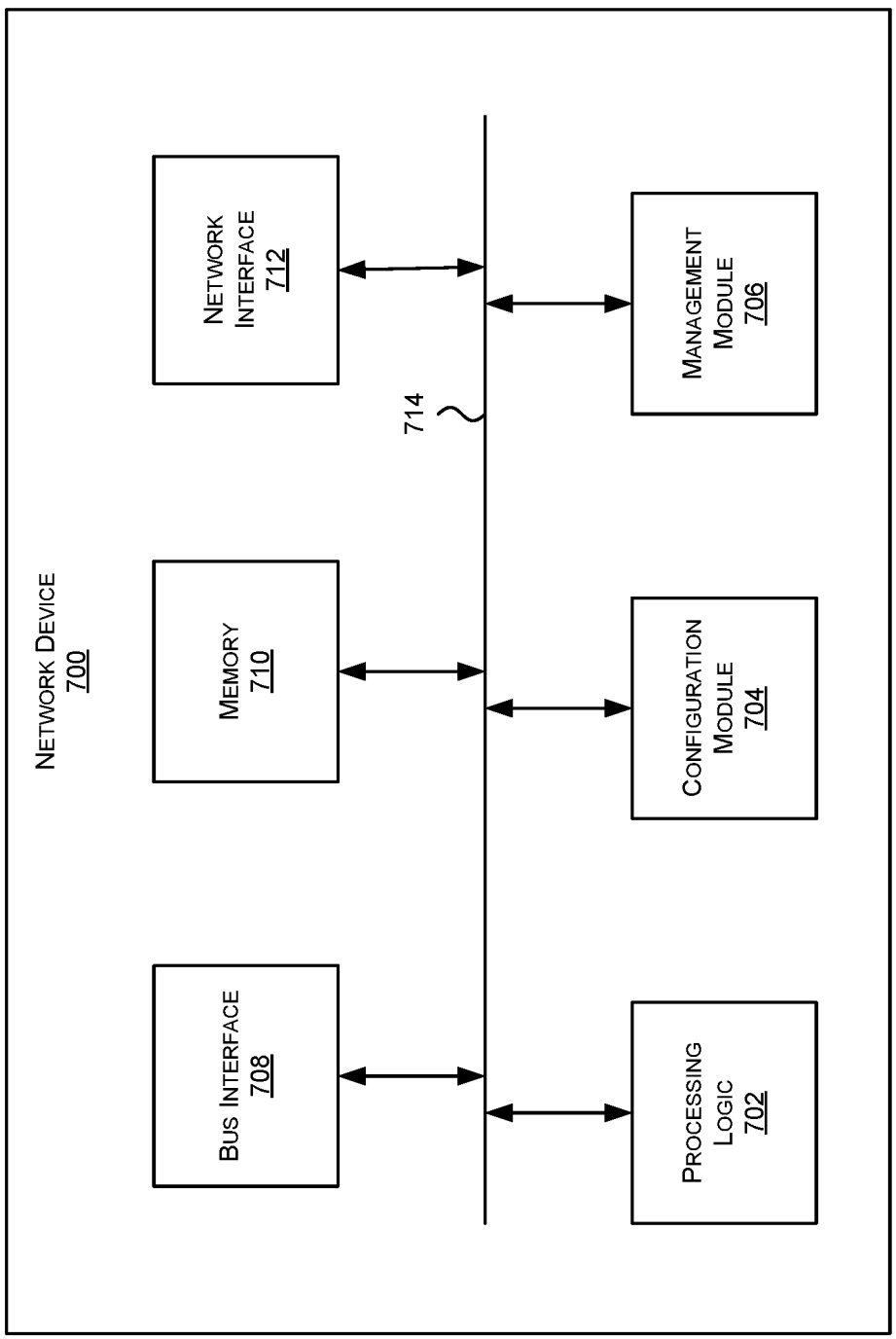
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. For example, the network device 700 can be an example of the first network device 112 or the second network device 118. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
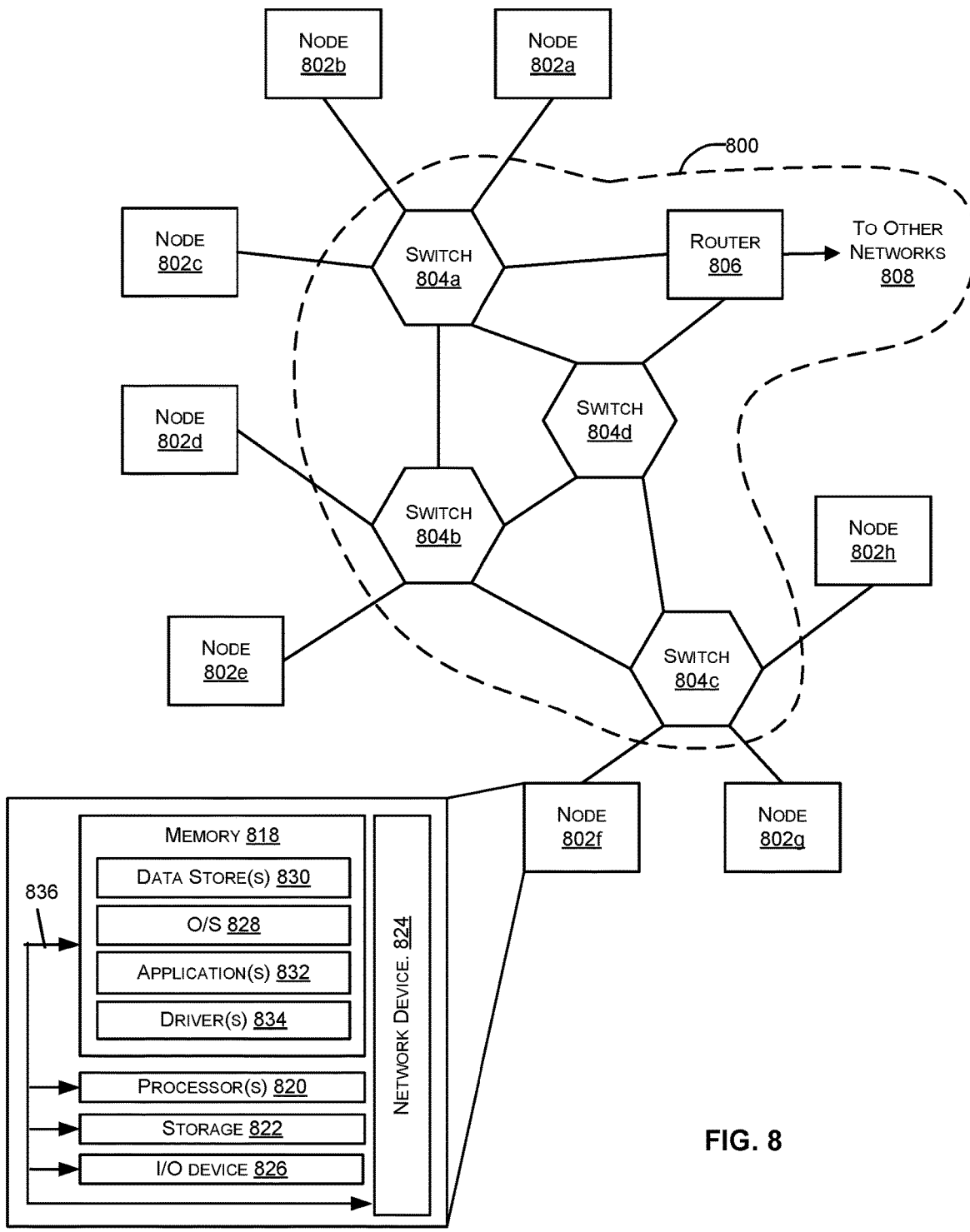
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein. The network 800 can be an example of the network 106.

Nodes 802a-802h may be any combination of host systems, processor nodes, storage subsystems, and I/O chassis that represent user devices, service provider computers or third party computers. As an example, the first host device 102 or the second host device 104 can be one of the nodes in the nodes 802a-802h.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by a first network device, comprising:
   generating packets for transmitting to a plurality of ports of a second network device over a multi-path connection of a Scalable Reliable Datagram (SRD) transport layer protocol, wherein the plurality of ports are associated respectively with a plurality of Internet Protocol (IP) addresses, and each packet includes one of the IP addresses from the plurality of IP addresses;
   transmitting, by the first network device, the packets over a network to the second network device via a top-of-the-rack (TOR) switch coupled between the second network device and the network, wherein the TOR switch routes each packet to a corresponding port of the second network device based on an IP address in each packet;
   determining, by the first network device, that an acknowledgement for a packet sent to a first IP address in the plurality of IP addresses has not been received for an SRD retransmission timeout period, the first IP address assigned to a first port in the plurality of ports of the second network device;
   regenerating, by the first network device, the packet with a second IP address in the plurality of IP addresses based upon the determination, the second IP address assigned to a second port in the plurality of ports of the second network device, and the second IP address being different than the first IP address; and
   sending, by the first network device, the regenerated packet to the second IP address of the second network device, wherein the TOR switch routes the regenerated packet to the second port based on the second IP address in the regenerated packet.

2. The computer-implemented method of claim 1, further comprising:
   generating heartbeat packets for transmitting to the first IP address;
   sending the heartbeat packets at an increasing interval between sequential heartbeat packets to the first IP address;
   determining that the increasing interval has reached a constant threshold interval; and
   sending the heartbeat packets at the constant threshold interval based upon the determination.

3. The computer-implemented method of claim 2, further comprising:
   receiving a heartbeat acknowledgement from the first IP address in response to a heartbeat packet; and
   upon receiving the heartbeat acknowledgement, resuming sending the packets to the first IP address of the second network device.

4. The computer-implemented method of claim 1, wherein the SRD transport layer protocol has a protocol header that contains a heartbeat indicator field.

5. A computer-implemented method, comprising:
   transmitting packets from a first network device to a plurality of ports of a second network device over a multi-path connection of a transport layer protocol, wherein the plurality of ports are associated respectively with a plurality of destination network addresses;
   detecting, by the first network device, a transport layer protocol retransmission timeout indicating a packet sent to a first destination network address in the plurality of destination network addresses of the second network device has not been received; and
   in response to detecting the transport layer protocol retransmission timeout:
      regenerating, by the first network device, the packet with a second destination network address in the plurality of destination network addresses of the second network device, the second destination network address being different than the first destination network address; and
      sending, by the first network device, the regenerated packet to the second destination network address of the second network device.

6. The computer-implemented method of claim 5, wherein each destination network address in the plurality of destination network addresses includes an Internet Protocol (IP) address or a Media Access Control (MAC) address.

7. The computer-implemented method of claim 5, wherein the transport layer protocol retransmission timeout has a duration that is less than a TCP retransmission timeout.

8. The computer-implemented method of claim 5, wherein the regenerated packet is sent to the second destination network address without resending the packet to the first destination network address.

9. The computer-implemented method of claim 5, further comprising sending a heartbeat packet to the first destination network address.

10. The computer-implemented method of claim 9, further comprising sending heartbeat packets at an increasing interval between sequential heartbeat packets to the first destination network address.

11. The computer-implemented method of claim 10, further comprising sending heartbeat packets at a constant threshold interval between sequential heartbeat packets to the first destination network address after the increasing interval has reached the constant threshold interval.

12. The computer-implemented method of claim 9, further comprising:
receiving a heartbeat acknowledgement from the first destination network address; and
upon receiving the heartbeat acknowledgement, resuming sending the packets to the first destination network address of the second network device.

13. The computer-implemented method of claim 5, wherein the transport layer protocol has a protocol header that includes a heartbeat indicator to indicate whether a packet is a heartbeat packet.

14. The computer-implemented method of claim 5, wherein the transport layer protocol is a Scalable Reliable Datagram (SRD) protocol.

15. The computer-implemented method of claim 5, wherein the plurality of ports of the second network device are coupled to a network via a top-of-the-rack (TOR) switch.

16. A first network device configured to:
transmit, by the first network device, packets to a plurality of ports of a second network device over a multi-path connection of a transport layer protocol, wherein the plurality of ports are associated respectively with a plurality of destination network addresses;
detect, by the first network device, a transport layer protocol retransmission timeout indicating a packet sent to a first destination network address in the plurality of destination network addresses of the second network device has not been received; and
in response to detecting the transport layer protocol retransmission timeout:
regenerate, by the first network device, the packet with a second destination network address in the plurality of destination network addresses of the second network device, the second destination network address being different than the first destination network address; and
send, by the first network device, the regenerated packet to the second destination network address of the second network device.

17. The first network device of claim 16, further configured to:
upon detecting the transport layer protocol retransmission timeout, send heartbeat packets to the first destination network address;
receive a heartbeat acknowledgement from the first destination network address; and
upon receiving the heartbeat acknowledgement, resume sending the packets to the first destination network address of the second network device.

18. The first network device of claim 17, wherein the heartbeat packets are sent at an increasing interval between sequential heartbeat packets to the first destination network address until a constant threshold interval is reached.

19. The first network device of claim 16, wherein each of the plurality of destination network addresses is a different Internet Protocol (IP) address.

20. The first network device of claim 16, wherein the plurality of ports of the second network device are coupled to a network via a final top-of-the-rack (TOR) switch, and wherein the final TOR switch routes the packets to the plurality of ports of the second network device based on a corresponding destination network address in each packet.

* * * * *